United States Patent [19]
Fessler et al.

[11] 4,187,262
[45] Feb. 5, 1980

[54] CARBONATOR AND LIQUID LEVEL CONTROL

[75] Inventors: Herman S. Fessler, Coon Rapids, Minn.; Gene A. Tracy, Amery, Wis.

[73] Assignee: The Cornelius Company, Anoka, Minn.

[21] Appl. No.: 900,177

[22] Filed: Apr. 26, 1978

[51] Int. Cl.² .................................................. B01F 3/04
[52] U.S. Cl. ..................................... 261/50 B; 99/275; 137/409; 261/64 D; 261/70; 261/DIG. 7; 426/477
[58] Field of Search ...................... 261/50 B, 64 D, 70, 261/DIG. 7; 426/474, 477; 99/275; 137/409

[56] References Cited

U.S. PATENT DOCUMENTS

| | | | |
|---|---|---|---|
| 312,289 | 2/1885 | Palmer | 261/70 |
| 828,334 | 8/1906 | Peterson | 261/70 |
| 2,217,841 | 10/1940 | Holinger | 261/DIG. 7 |
| 2,300,300 | 10/1942 | Lund | 261/DIG. 7 |
| 2,314,984 | 3/1943 | Hudson | 261/DIG. 7 |
| 2,339,640 | 1/1944 | Holinger | 261/DIG. 7 |
| 2,414,607 | 1/1947 | Phillips | 261/DIG. 7 |
| 3,206,069 | 9/1965 | Jacobs et al. | 261/DIG. 7 |
| 3,248,098 | 4/1966 | Cornelius | 261/DIG. 7 |
| 3,408,053 | 10/1968 | Vantroba | 261/DIG. 7 |
| 3,552,726 | 1/1971 | Kraft | 261/DIG. 7 |
| 3,578,214 | 5/1971 | Iannelli | 261/DIG. 7 |
| 3,617,032 | 11/1971 | Tracy | 261/DIG. 7 |
| 3,813,010 | 5/1974 | Hassell et al. | 261/DIG. 7 |

OTHER PUBLICATIONS

Compac Engin. Co., Paradise, Calif., 95969, Bulletin Catalog No. 7600.

*Primary Examiner*—Richard L. Chiesa
*Attorney, Agent, or Firm*—Henry C. Kovar

[57] ABSTRACT

A carbonator has a pressure vessel, a nozzle for introducing water and carbon dioxide into the vessel, a water level control including a reed switch and a magnetic float for sensing the level of water and operating the reed switch; a novel housing encloses the level control and provides a unidirectional fluidically affected delay in sensing and control response to a rising water level during filling of the carbonator; the housing has a water chamber which encloses the level sensing float, a water inlet into the water chamber near the level of a maximum desired water level in the vessel, a water outlet from the bottom of the water chamber, and a check valve in the water outlet for allowing flow of water out of the water chamber and for precluding flow of water into the water chamber from the water outlet.

39 Claims, 4 Drawing Figures

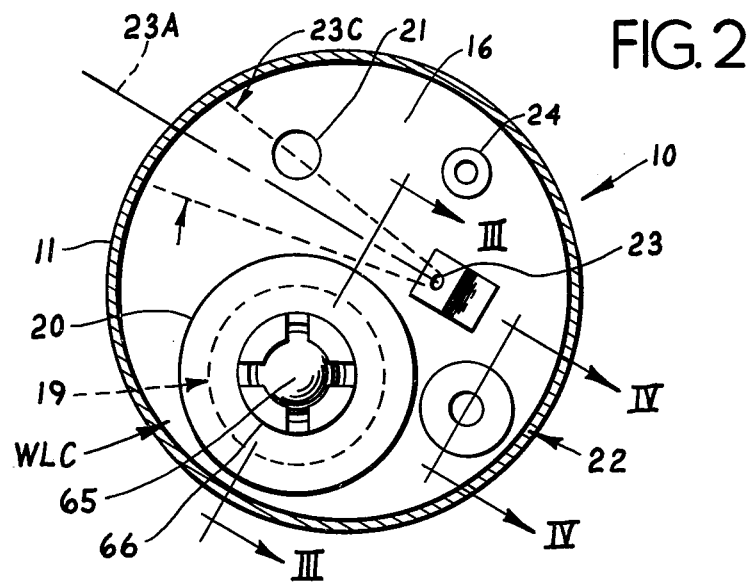
FIG. 2
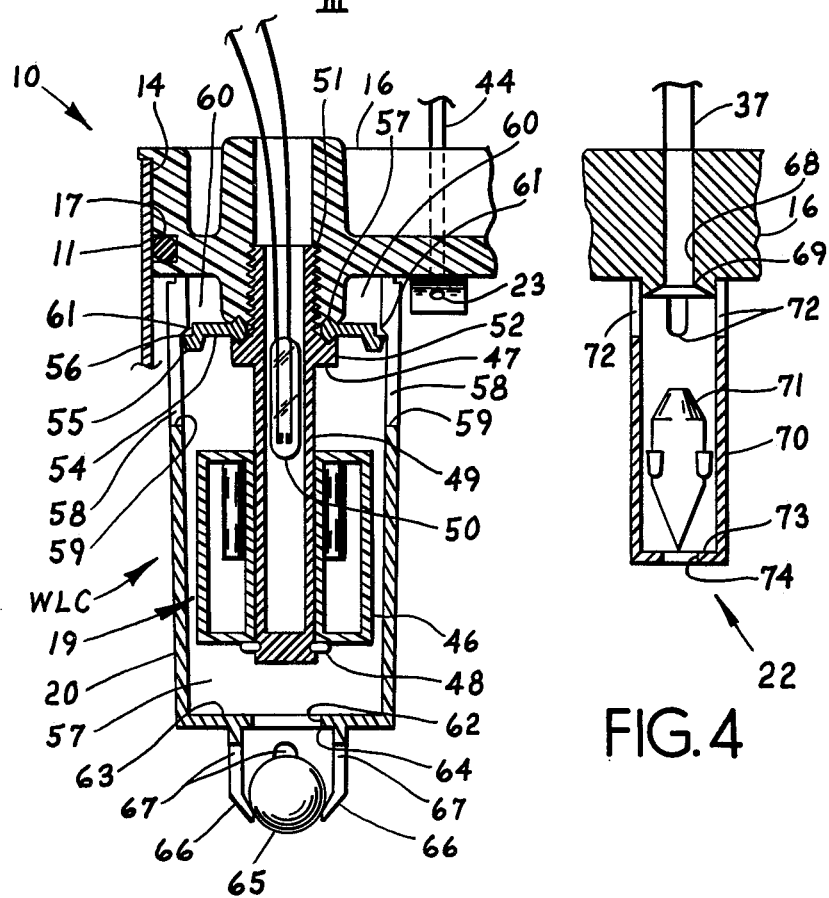
FIG. 3
FIG. 4

CARBONATOR AND LIQUID LEVEL CONTROL

BACKGROUND OF THE INVENTION

1. Field of the Invention

This invention pertains to a carbonator having a water level control, and to a liquid level control for providing a delayed response to a rising liquid level.

2. The Prior Art

The prior carbonators are characterized by being of large size and volume and requiring rather high pressures for operation. The prior art typically utilizes a carbonator pressure of 80–150 PSIG. Control of quantities of water has been most easily and often accomplished by suspending the entire carbonator on a spring scale device and sensing the weight of the entirety of the carbonator vessel and water therein. This has both advantages and disadvantages. Functional advantages include external adjustability for minimum and maximum water levels, any shape of carbonator vessel may be used, and small cross-section vessels may be used. Disadvantages are external mechanisms for weighing, difficulty in cooling the carbonator and the inlet and outlet lines usually have to be flexible. A specific example of this structure is Gene A. Tracy U.S. Pat. No. 3,617,052.

Another type of carbonator has an internal water level sensor. This structure also has advantages and disadvantages. The advantages include direct contact of the level control with water, structural protection of the level control as it is enclosed within a pressure vessel, it's easier to refrigerate the carbonator, and fluid lines into and from the carbonator may be rigid as they do not need to flex. Disadvantages of the internal level control include false signaling due to turbulence and splashing of water within the carbonator, a relatively large area of cross section has been required in order to accommodate both carbonating and level sensing structures within the carbonator, and expensive logic units have been needed to interpret signals from level sensing structure. A specific example of this type of structure is R. T. Cornelius' U.S. Pat. No. 3,248,098.

These prior carbonator and the water level controls used with the carbonators have usually required rather complicated structure for controlling the level of water, due in large part to the violently turbulent nature of water within a carbonator during filling.

Specific examples of relevant prior U.S. patents include the following:

No. 2,414,607; P. H. Phillips is the most relevant known prior art. The Phillips carbonator features violent turbulation of water and carbon dioxide during filling and controls the water level with an electrode probe within the carbonator vessel. A housing within the vessel shields the probe from the violent water movement for preventing false "filled" signals.

No. 3,813,010; D. A. Hassell and J. R. McMillin is relevant because the preferred arrangement of hydraulic and pneumatic components comprising a beverage system within which the present invention is utilized, is disclosed and claimed. The carbonator and level control of this invention are not found in Hassell and McMillin.

No. 3,578,214; F. M. Iannelli has a carbonator with two chambers, and a reed switch is operatively connected to a float in one of the chambers.

No. 2,300,300; J. K. Lund has a carbonator with a float for operating a magnetically responsive switch.

Nos. 2,217,841 and 2,339,640; C. J. Holinger each have a violent carbonation chamber inside of a less violent reservoir chamber with the level control being in the less violent chamber.

Publication of relevancy include Catalog number 86-675B by Gems Sensor Division, Delaval Corporation, Farmington, Conn. 06032 and Catalog number 7600 by Compac Engineering, Inc., 100 Easy Street, Paradise, Calif. 95969. These publications are engineering manuals illustrating reed switches and magnetic floats for actuating the reed switches. The manuals illustrate and instruct in state of the art usage of these reed switch/float controls.

In the differential control of a liquid level at two different heights, specifically a relatively high maximum level and a much lower minimum level, it is current practice to provide two floats and two switches, and/or a logic relay system.

It is to simplification of a liquid level control of the differential type that our invention is directed; specifically to eliminate mechanical or electrical logic or components for multi-level control of liquids.

OBJECTS OF THE PRESENT INVENTION

It is an object of the present invention to provide a carbonator having a delayed response to a rising liquid level during filling.

It is an object of the present invention to provide a simplified construction of carbonator in which a singular sensor for water level functions for sensing both low and high levels of water.

It is an object of the present invention to provide a carbonator of small size in which an internal water level control is shielded from the violent turbulation of water during filling and carbonation.

It is an object of the present invention to provide a carbonator water level control having a housing enclosing a water level sensing device for separating the sensing device from a reservoir when it is placed into a carbonator.

It is an object of the present invention to provide a liquid level sensor which is actuatable for giving a shut-off signal at a maximum level and a turn-on signal at a minimum level.

Many other advantages, features and additional objects of the present invention will become apparent to those versed in the art upon making reference to the enabling detailed description and accompanying drawings in which the preferred embodiment incorporating the principles of our present invention is set forth and shown by way of illustrative example.

SUMMARY OF THE INVENTION

A carbonator with a pressure vessel, means for introducing water and carbon dioxide into the vessel, and a water level sensor, has a housing in fluid communication with the pressure vessel, the housing has a water chamber within which is the water level sensor, a water inlet at the level of a desired maximum water level, a water outlet below the water inlet and means in the water outlet for precluding flow of water back into the water chamber; a liquid level control has means for sensing the level of a liquid, a sensor housing enclosing the sensor, a liquid inlet port into the housing, a liquid outlet port from the housing and means in the outlet for precluding flow of liquid into the housing.

ON THE DRAWINGS

FIG. 2 is an upward looking sectional plan view taken through lines II—II of FIG. 1;

FIG. 3 is an elevational cross-sectional view of a liquid level control and housing therefor in the carbonator of FIG. 1 and as seen through lines III—III of FIG. 2; and FIG. 4 is a elevational cross-sectional view of a liquid snifter valve in the carbonator of FIG. 1 and as seen through lines IV—IV of FIG. 2.

AS SHOWN ON THE DRAWINGS

Figure 1:
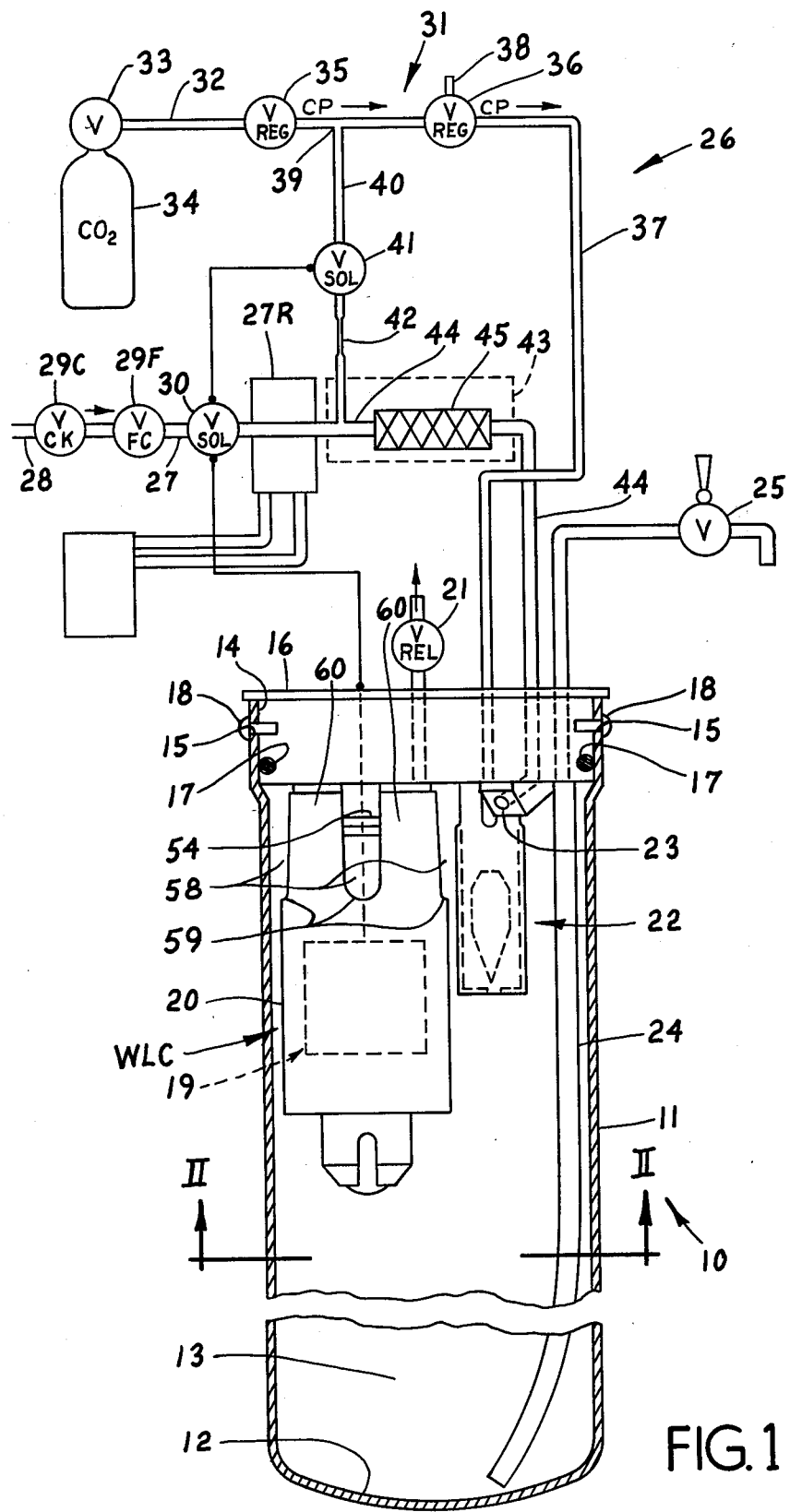
FIG. 1 is an elevational view in partial section illustrating a carbonator provided in accordance with the principles of the present invention.

The principles of the present invention are particularly useful when embodied in a carbonator of the type illustrated in FIG. 1 and generally indicated by the numeral 10.

The carbonator 10 has a pressure vessel 11 which is a length of tubing having a closed bottom end 12 forming a carbonated water storage reservoir 13, and an open end 14 with a plurality of radially spaced apart apertures 15 about the open end 14. The open end 14 is closed by a removable plug type cover 16 which preferably is molded of plastic, and is sealed to the open end 14 by a seal ring 17, and is held in the open end 14 by removable fastener screws 18.

Mounted to and carried by the cover 16 is a water level control WLC having a water level sensor 19 and a housing 20 enclosing the water level sensor 19, a safety relief valve 21 which opens at 90 PSIG, a liquid snifter valve 22, a spray nozzle 23 for introducing water and carbon dioxide gas into the pressure vessel 11, and a syphon tube 24 through which carbonated water is withdrawable. The syphon tube 24 is fluidly connected to a dispensing valve 25.

The hydraulic and pneumatic supply system that supplies the carbonator 10 with water and carbon dioxide gas is generally indicated by the numeral 26. The supply system 26 includes a water supply conduit 27 having an inlet end 28 connectable to a source of water which needs to be pressurized to at least 20 PSIG (138 kPa), a reverse flow check valve 29c and a flow control valve 29f, and a normally closed solenoid actuatable valve 30 for normally precluding water flow. A gas supply conduit 31 has an inlet end 32 connected to a shut-off valve 33 on a compressed gas vessel 34 which contains carbon dioxide. A first gas pressure regulator 35 reduces the gas pressure of the carbon dioxide to a constant regulated pressure of 80 PSIG (550 kPa) and a second gas pressure regulator 36 further reduces the pressure of carbon dioxide to a constant pressure of 15 PSIG (103 kPa). A gas conduit outlet end 37 fluidly connects the second regulator 36 to the interior of the carbonator 10 through the snifter valve 22. The second regulator 36 has a relief valve 38 which is preset to open just slightly above the constant pressure of the second regulator 36. Specifically, the relief valve opens at under 19 PSIG (131 kPa) or about 4 PSIG (27 kPa) above the desired constant pressure. An intermediate section 39 of the gas conduit 31 fluidly connects the first regulator 35 to the second regulator 36 and a carbonator gas conduit 40 fluidly branches off of the intermediate section 39. The carbonation gas conduit 40 includes a normally closed solenoid actuatable gas valve 41 and a small diameter elongated restrictor tube 42 which controls a flow of carbon dioxide gas when the solenoid valve 41 is open. The preferred restrictor tube 42 is a 1.50 inch (38 mm) long length of stainless steel surgical tubing with an inside diameter of 0.0175 inch (0.45 mm). The carbonation gas conduit 40 and water conduit 27 are fluidly jointed together in an initial mixing and carbonation zone 43 in which the carbonation conduit 40, water conduit 27 and an outlet mixing conduit 44 form a three-legged "T-shape". The mixing conduit 44 includes a turbulator 45 which is a mixing device which violently agitates the water and carbon dioxide gas during flow. The mixing conduit 44 then leads to the spray nozzle 23 which commonly introduces both water, which is partially carbonated, and carbon dioxide gas into the carbonator 10. A conventional refrigeration system 27R cools water in the conduit 27 before the water reaches the mixing zone 43. The solenoid valves 30, 41 are both operatively connected in series to the water level sensor 19 and are simultaneously actuatable by the sensor 19.

FIG. 2 illustrates the relative placement and angular position of the water level sensor 19 and housing 20, the snifter valve 22 and the spray nozzle 23 which has a spray cone defined within the lines 23C and which is generated around a spray axis 23A. The axis 23A of the spray cone 23C is directed downwardly at about forty-five degrees and the angle of intersection against the vessel 11 is about 20° from perpendicular. The nozzle 23 preferably has a 0.070 inch (1.8 mm) round bore by about one quarter inch (6.5 mm) long. The spray cone 23C is directed so that it obliquely impinges upon the vessel 11 and so that it sprays past the housing 20 without contact and the spray cone 23C does not directly impinge at a perpendicular angle against any surface within the carbonator 10.

An important feature of this invention is the housing 20 enclosing the liquid level sensor 19 as best shown in detail in FIG. 3. The liquid level sensor 19 includes a toroidal buoyant magnet-equipped float 46 that is movable upward and downward between an upper stop 47 and a lower stop 48 on a stem 49 within which there is hermetically encapsulated reed switch 50. The switch 50 is operatively connected to control the solenoid valves 30, 41. The stem 49 has a threaded section 51 which is screwed into the cover 16, and a wrenching section 52 for tightening the stem 49 in and to the cover 16.

A housing retainer 54 is mounted and held to the cover 16 by the sensor stem 49, the retainer 54 is a toroidal disc having a peripheral assembly guide cam 55 and a retention edge 56. The retainer 54 also has a diamond shaped cross section toroidal seal member 57 which physically embeds into both the stem 49 and cover 16 and forms a mechanical flud tight seal.

The housing 20 is a tubular cylindrical member having an internal water chamber 57 within which are the float 46, and reed switch 50. The housing 20 has a plurality of apertures forming water inlet ports 58. The water ports 58 are equally spaced from one another around the housing and preferably are opposite each other. Each water inlet port 58 has a lower edge 59 which determines a level at which water can begin to flow into the water chamber 57. Each water inlet port lower edge 59 is substantially above a water level that will support the float 46 and cause the reed switch 59 to be actuated; a specific example is ½ inch (13 mm) above a water level sufficient for raising the float 46 sufficient to actuate the reed switch 59. The water inlet ports 58 each extend to the top of the housing, and between the water inlet ports 58 are cantilevered fingers 60. Each of the cantilevered fingers 60 has a snap-on clip 61 which hooks on to the retainer edge 56 of the housing retainer 54. At the bottom of the housing 20 is a water outlet port 62 which fluidly leads from the bottom 63 of the water chamber 57. The water outlet port 62 has a downward facing valve seat 64 against which a buoyant check valve 65 is seatable for closing the water outlet port 62. The check valve 65 has a specific gravity of less than 1.00 and greater than 0.90; a preferred specific gravity is 0.96±0.02. The check valve 65 is preferably an elastomeric ball of a food grade compound which is soft enough to seal when against the valve seat 64. The sensor stem 49 and lower float stop 48 are positioned to limit travel of the float 46 so that it cannot contact against the bottom 63 of the water chamber 57 and block the water outlet port 62. As best shown in FIG. 3, the float 46 displaces the majority of the volume within the water chamber 57 below the water inlet ports 58. The float 46 is also sized to have a reasonably close clearance to the housing 20; a preferred clearance is less than one-sixteenth inch (1.6 mm) on each side. The check valve 65 is enclosed and supported by a valve cage 66 which has side ports 67 out of which water can downwardly flow when the valve 65 is in the position shown. The valve 65, valve cage 66 and valve seat 64 are all below the normal water level in the carbonator 10.

The snifter valve 22 of FIG. 4 includes a second gas port 68 fluidly connected to the second regulator 36 via gas conduit 37. This port 68 is referred to as a second port because the nozzle 23 functions as a gas inlet port during carbonation and filling of the carbonator 10. The gas port 68 has a valve seat 69 facing toward the interior of the carbonator 10 and a valve cage 70 extends from the port 68 and houses a snifter valve element 71. The valve cage 70 has a plurality of gas inlet ports 72 which are spaced about the cage 70 and which are directly opposite one another. The valve cage 70 has a bottom 73 which supports the snifter valve element 71, and there is a water inlet port 74 below the snifter valve element 71. As shown in FIG. 4, there is fluid communication between the gas inlet ports 72 and water inlet port 74 inside of the valve cage 70 and past the snifter valve element 71. The water inlet port 74 and cage bottom 73, and preferably most of the snifter valve element 71 are normally below the water level in the carbonator 10 so that the snifter valve is kept wet and does not dry and stick the valve element 71 to the cage 70. The snifter valve gas inlet ports 72 are substantially above the level of the sensor housing water inlet port lower edges 59 and are above the maximum desired water level within the carbonator 10.

In the use and function of the carbonator 10, the inlet 28 of the water conduit 27 is connected to a source of water such as a municipal supply. A water pressure of about 30 PSIG (207 kPa) is preferred. A vessel 34 of carbon dioxide is connected to the gas conduit 31 and the first gas pressure regulator 35 is set to provide a constant pressure of 80 PSIG (550 kPa) and the second gas pressure regulator 36 is set to provide a pressure of 15 PSIG (103 kPa) in the outlet 37 of gas conduit 31 and within the carbonator 10 as a storage and holding pressure. The vent or relief valve 38 is pre-set to open at about 4 PSIG (27 kPa) above the set pressure of the second regulator 36; for example, at 19 PSIG (131 kPa) for venting gas from and relieving excess pressure within the carbonator 10. The carbonator safety relief valve is pre-set to open at about 90 PSIG (620 kPa), or higher than the pressures of either the first or second gas regulators 35, 36 in order to prevent failure of the carbonator 10 should it be excessively pressurized due to failure of the first regulator 35. Assuming the carbonator 10 to be initially empty, it will need to be filled. The float 46 will be suspended on the bottom stop 48 of the stem 49 and the reed switch 50 will be calling for introduction of water and carbon dioxide into the carbonator 10. In response to the reed switch 50 calling, the water solenoid valve 30 and carbon dioxide solenoid valve 41 will be simultaneously opened and both water and carbon dioxide will flow into the mixing zone 43 and from there be introduced into the carbonator 10 via nozzle 23. The rate of flow of water is controlled by the water flow control 29F and the flowing water is cooled to about 35° F. (1° C) by the refrigeration system 27R and introduced into the mixing conduit 44. The carbon dioxide gas flows at 80 PSIG (550 kPa) pneumatic pressure through the valve 41 and to the restrictor 42 which controls the rate of flow of carbon dioxide gas. The flow rates of water and carbon dioxide are kept at a given proportion to one another in order to produce approximately 4.0 volumes of carbonation but the total flow rate has to be proportioned to the physical size of the carbonator 10. As an example, for a vessel 11 having an internal diameter of 2.40 inches (61 mm) a maximum water flow rate of 0.6 oz./sec. (18 cc/sec.) and a carbon dioxide flow rate of 0.22 CFM (0.104 liter/sec.) has been found optimal. Water flow rates of less than 0.2 oz./sec. (6 cc/sec.) and corresponding lesser gas flows have been found to be insufficiently violent for adequate carbonation. Higher water and gas flow rates are too violent. If the carbonator 10 is of a larger size, the flow rates would need to be correspondingly increased, and if the carbonator 10 were smaller, the flow rates would need to be decreased. The flows of water and carbon dioxide gas are combined together in the mixing conduit 44 and simultaneously run through the turbulator 45 which initially mixes the water and carbon dioxide together and produces an initial carbonation level of about two volumes. The then partially carbonated water and the remaining free carbon dioxide gas are then introduced via spray nozzle 23 into the carbonator 10. The carbonator 10 is preferably immersed in an ice water bath (not shown) and the vessel 11 is preferably metal. The water flowing into and subsequently being stored is further cooled and then maintained at a temperature of 32° F. (0° C.).

The water and carbon dioxide are introduced into the carbonator in an expanding conical shaped spray 23C which is directed past the sensor housing 20 and away from the snifter valve 22. The centerline 23A of the spray cone 23C as well as the spray cone 23C are directed downwardly at about 45° and at an angle of about 20° as seen in FIG. 2 against the vessel 11. The spray cone 23C is obliquely impinged against the vessel 11 and the spray bounces off of the vessel in both a downward and sideways motion. Specifically, as viewed from the bottom in FIG. 2, the resulting motion would be a counter clockwise helical motion which products a predetermined turbulence within the carbonator 10. This turbulence is sufficient to effect another two volumes of carbonation to bring the total carbonation to about four volumes, and the helical motion tends to stop the water from boiling up to the top of the carbonator 10. Proper ratioing of water and gas flow, as previously described, is done to achieve this effect. As water and carbon dioxide is being introduced into the carbonator 10, any excessive increase in pressure will be relieved by venting of carbon dioxide gas via the vent valve 38.

During filling of the carbonator 10, the level of carbonated water will be rising. When the water reaches the buoyant check valve 65, the valve 65 will float up, seat against the valve seat 64 and close the housing water outlet port 62 and preclude water from flowing into the water chamber 57 via the outlet port 62. Because no water can enter the water chamber 57, the float 46 will remain on the bottom 48 of the switch stem 59.

The water level will eventually reach the lower edge 59 of the water inlet ports 58 and upon exeeding this level, water will run through the inlet ports 58 and on top of the float 46. The inlet port lower edges 59 are all at the same level and the flow of water is very instantaneous and from all directions upon the float 46 which reduces any effect that could cause the float 46 to become angularly cocked on the stem 49 and become jammed. The incoming water forms a pool on top of the float 46 and because the gap between the float 46 and the housing 20 is rather small, gas underneath the float 46 has to gurgle out in bubbles prior to being replaced with water. This provides a dampener action so that the float 46 doesn't pop up and hit the upper stop 47 and/or pop up and give a false "filled" signal. After all of the gas has risen from underneath the float 46 and escaped, further flow of water downwardly past the float 46 will cause the float 46 to rise. When the float 46 rises, it will eventually actuate the reed switch 50 by magnetic influence which effects to close the water and gas solenoid valves 30, 41. Flow of water and carbon dioxide then ceases and the carbonator 10 is filled to a level approximately mid-way in between the inlet port lower edge 59 and the housing retainer 54. The water in the carbonator has a carbonation of about four volumes and a temperature close to 32° F. (0° C.). Carbonated water is then withdrawn by opening the dispensing valve 25.

The water level in the carbonator 10 drops when the dispensing valve 25 is opened. As the water level begins to drop, the buoyant check valve 65 drops into the cage 66 and opens the water outlet port 62. The check valve 65 drops because it has a specific gravity so close to water that the least bit of head pressure above the valve 65 will blow it downwardly and off its seat 64. As previously described, the preferred specific gravity of the check valve 65 is 0.96±0.02. Then the check valve 65 opens, the water level in the water chamber 57 follows down the water level in the remainder of the carbonator 10. Just prior to the float 46 making contact with the lower stop 48, the float 46 magnetically effects the reed switch 50 for opening the water and gas solenoid valves 30, 41 for refill of the carbonator 10. Termination of the refilling cycle functions just as the previously described shut-off function during initial filling. When the dispensing valve 25 is opened, the flow rate out of the carbonator via the syphon tube 24 is about 1.3 oz./sec. (38 cc/sec.) which is greater than the maximum filling rate previously described. Carbonated water from the reservoir 13 is utilized to satisfy the flow rate required by the dispensing valve 25. After the dispensing valve 25 is closed, the reservoir 13 is refilled and the water level filled up to water inlet ports 58 whereupon the water level sensor 19 terminates introduction of water and carbon dioxide gas.

The housing 20 improves the operating function of the level sensor 19 by eliminating false "filled" signals from turbulent water slapping the float 46 up and down. Any upward splash of water cannot reach the float 46 and the check valve 65 closes the outlet port 62 to keep upwardly splashing water out. If water splashes over and against the top of the housing 20, any water above the level of the housing retainer 54 goes on top of the retainer 54 and when dumped out flows out of water inlet ports 58 and does not go into the water chamber 57. If water is splashed into the water chamber 57, the check valve 65 will open outlet port 62 and the splashed-in water will drain out to the level of the rest of the water in the carbonator 10. With the water outlet 62 being below the lowest possible level of the float 46, it is impossible for the float 46 to plug the outlet 62 while the water in the reserve 13 is being drawn and the water consequently drops far below the housing 20. The water inlet ports 58 being above the float 46 effects dropping of water onto the float 46 and the float 46 does not rise until the water below it corresponds to and indicates a true water level sufficient to call for termination of filling. Because the float 46 displaces the majority of the volume of the water chamber 57, when water begins to fill the water chamber 57, sensing of the water by the float 46 is almost instantaneous yet the float does not exhibit erratic up and down movement. The check valve 65 and valve seat 62 are normally below the level of water in the carbonator 10 and as such are kept lubricated and they do not dry out and stick together. If the float 46 rises to a position where the top of the float 46 is flush with the lower edges 59 of the water inlet ports 58 and the true water level is not at port 58 height or greater, the water will run across the top of the float 46 and out the opposite inlet ports 58.

The housing 20 fluidically and very reliably effects a delaying response by the float 46 and reed switch 50 to a rising water level because the rising water level cannot affect the float until water overflows the inlet ports 58. This fluidic delay is unidirectional because water is able to flow only one way through the housing 20 and past the level sensor 19. Specifically, water can only come in on top and flow downwardly over the float 46 and reed switch 50; the check valve 65 precludes any contact by an upward flow of water against the float 46. This delay eliminates false or spurious "filled" signals, reduces cycling of the solenoid valves 30, 41, extends the life of all electrical components, reduces failure probability, and eliminates the need for double switches, double floats, logic relays and the like relatively complicated and costlier components. However, the reaction of the level sensor 20 to a dropping water level is immediate because during withdrawal of water from the carbonator 10, the water level within the housing 20 follows down the water level of the water outside of the housing 20 because of the check valve 65 opening.

The retainer 54 is semi-permanently fixed to the cover plug 16 by the sensor 49 but the housing 20 is easily installable or removable due to its snap-fit to the retainer 54. When the housing 20 is installed, is is pushed against the retainer 54 and the guide cams 55 pry open the cantilevered housing fingers 60. When the housing 20 is on far enough, the fingers 60 snap over the retainer 54 and the finger clips 61 secure the housing by engaging the retainer edge 56. To remove the housing 20, the cover 16 has to be removed from the vessel 11 and the housing 20 is manually grasped and just pulled off the retainer 54. The housing finger clips 61 force the fingers 60 open as the housing comes off of the retainer 54.

The snifter valve 22 also improves operation of the carbonator 10. As previously mentioned, the holding or storage gas pressure for the carbonator 10 is provided through the gas conduit outlet 37 which is fluidly connected to the second gas port 68. When the carbonator 10 becomes pressurized in excess of 19 PSIG (133 kPa), the regulator relief valve 38 opens and carbon dioxide relieves outwardly through port 68 and gas conduit 37. The carbon dioxide gas being relieved exits the carbonator via gas inlet ports 72. Should water be splashed into the ports 72, it may just be splashed through the cage 70 and out the opposite port 72. If water falls into the cage 70, the water may flow past the snifter valve 71 and out the water inlet port 74. At least part of the snifter valve 71, and the bottom 73 and water inlet 74 are normally below the water level in the carbonator 10, and are kept lubricated and wetted so they cannot dry out and stick together. When the water level rises, it flows into the water inlet 74 and when the level drops, it flows out of the water inlet 74. If the water level sensor 19 should fail, the snifter valve 71 will rise and seat against the valve seat 69 and close the gas port 68 so water cannot escape into the regulator 36.

The carbonator 10 and water level control of sensor 11 and housing 20 offer many important improvements. Simplicity was previously mentioned, small size is another advantage. The physical embodiment of this invention is only 2½ inches (64 mm) in diameter which is a significant reduction in size over previous carbonating devices. The height of the vessel can be either short or tall, for example nine inches (240 mm) or eighteen inches (480 mm) in height and reservoir capacity will vary accordingly. The cost of the level control has been significantly reduced because the housing 20 replaces a switch, and other mechanical or electrical logic components for giving the differential between "start filling" and "stop filling" water levels.

Although other advantages may be found and realized and various and minor modifications may be suggested by those versed in the art, be it understood that we wish to embody within the scope of the patent warranted hereon, all such improvements as reasonably and properly come within the scope of our contribution to the art.

We claim as our invention
1. A carbonator, comprising
   (a) a pressure vessel for containing therein water and carbon dioxide under pressure;
   (b) means for introducing water into said vessel;
   (c) means for introducing carbon dioxide into said vessel;
   (d) means for controlling the level of water in said pressure vessel, said control means comprising
      (1) means for sensing the level of water within the vessel, and
      (2) means operative by said sensing means for controlling introduction of water into the vessel; and
   (e) a housing within the pressure vessel and enclosing said level sensing means, said housing having
      (1) a water chamber within which is said sensing means
      (2) a water inlet port to said water chamber, said port being substantially at the level of a desired maximum water level within said vessel,
      (3) a water outlet port from said water chamber, said outlet port being substantially below said inlet port, and
      (4) means in said outlet port for checking against flow of water into the water chamber through the outlet port.
2. A carbonator according to claim 1, in which said water introducing means and said carbon dioxide introducing means are common to each other.
3. A carbonator according to claim 2, in which said common introducing means is a fluid spray nozzle, said nozzle being positioned within the vessel and being sized such that a spray pattern of water and carbon dioxide therefrom does not directly impinge upon said housing.
4. A carbonator according to claim 3, in which said housing is positioned immediately adjacent to a sidewall of the pressure vessel, and in which said nozzle is positioned for spraying past said housing.
5. A carbonator according to either of claims 3 or 4, in which said nozzle is positioned for directing a spray pattern downwardly at about forty-five degrees.
6. A carbonator according to any of claims 2, 3 or 4, in which said common introducing means is positioned and disposed for directing water and carbon dioxide obliquely against inner surfaces of the pressure vessel.
7. A carbonator according to claim 1, including
   (a) a gas inlet/outlet port connectable to means for regulating the pressure within the pressure vessel to within a predetermined range;
   (b) a snifter valve within said pressure vessel and on said port, for allowing flow of carbon dioxide in or out of said port and for precluding flow of water into said port;
   (c) a snifter valve housing enclosing said snifter valve and having
      (1) a water inlet below said valve, and
      (2) a gas inlet/outlet adjacent to said port.
8. A carbonator according to claim 7, in which said snifter valve housing water inlet and gas inlet/outlet are in fluid communication with one another through the snifter valve housing and past the snifter valve.
9. A carbonator according to either of claims 7 or 8, in which said gas inlet/outlet comprises a plurality of apertures through said snifter valve housing, said apertures being in line with one another.
10. A carbonator according to either of claims 7 or 8, in which said snifter valve housing water inlet is at a level below the level of said sensing means housing water inlet port.
11. A carbonator according to claim 10, in which at least part of said snifter valve is normally below the level of said sensing means housing water inlet port.
12. A carbonator according to either of claims 7 or 8, in which said snifter valve housing gas inlet/outlet is at a level substantially above the level of the sensing means housing water inlet port.
13. A carbonator according to claim 1, in which said controlling means comprises a reed switch and in which said sensing means comprises a buoyant float, said reed switch and said float both being enclosed by said housing.
14. A carbonator according to claim 13, including means for limiting movement of said float, said water outlet port being at a level below the lowest possible level of said float.

15. A carbonator according to either of claims 13 or 14, in which said float displaces a majority of the volume within the water chamber.

16. A carbonator according to claim 1, in which said water outlet port is in a bottom of the housing, and leads from a bottom of the water chamber.

17. A carbonator according to claim 1, in which the water inlet port comprises a plurality of spaced apart apertures, all of which are substantially at the same level.

18. A carbonator according to claim 17, in which the housing includes a plurality of cantilevered mounting fingers extending upwardly between the water inlet port apertures, each finger having means for securing the housing to the pressure vessel.

19. A carbonator according to claim 18, in which securing means are snap-on clips.

20. A carbonator according to either of claims 17 or 18, in which said apertures are positioned directly opposite each other.

21. A carbonator according to claim 1, in which the checking means comprises a valve seat in said outlet port, and a buoyant valve element seatable against said valve seat for closing the outlet port.

22. A carbonator according to claim 21, in which the valve element is an elastomeric ball.

23. A carbonator according to claim 22, in which the ball is made of an elastomeric material having a specific gravity of less than 1.00.

24. A carbonator according to any of claims 21, 22 or 23, in which said valve element has a specific gravity greater than 0.90.

25. A carbonator according to claim 1, in which said pressure vessel comprises a cover removably secured to a tank, and in which said controlling means and said housing are removably secured to said cover.

26. A carbonator according to claim 25, in which a housing retainer is fixedly secured to said cover, and in which said housing and said housing retainer include means for snap-fitting the housing to the retainer.

27. A carbonator according to claim 26, in which said housing retainer is secured to the cover by the control means.

28. A carbonator according to claim 27, in which said housing retainer includes seal means for fluid tightly sealing the control means to the cover.

29. A carbonator according to claim 1, in which said checking means is positioned within the pressure vessel at a level below a level at which water acting upon said sensing means will effect operation of said control means, for normally submerging said checking means in water.

30. In a carbonator water level control having means for sensing the level of water, said sensing means being mountable in fluid communication with a carbonator vessel, a housing enclosing said sensing means, said housing being mountable within a carbonator vessel and having a water chamber within the housing,
a water inlet port through the housing and into the water chamber, said inlet port being substantially above a bottom of the water chamber,
a water outlet port through the housing and from the water chamber, said outlet port being substantially below said inlet port, and
means in fluid communication with said outlet port for checking against flow of water through said outlet port and into said water chamber;

the improvement comprising
(1) a housing retainer mounted and fixed with respect to said sensing means, said housing being snap-fitted to said retainer; and
(2) a plurality of such water inlet ports and a plurality of fingers in said housing, there being a single finger between adjacent water inlet ports with the fingers providing the snap fit to the retainer.

31. A carbonator water level control according to claim 30, in which said housing retainer is mounted and fixed to a cover plug, said cover plug having means for being secured to a carbonator vessel.

32. A carbonator water level control according to claim 31, in which said housing retainer includes means for fluid tightly sealing said sensing means to said cover plug.

33. In a carbonator water level control having means for sensing the level of water, said sensing means being mountable in fluid communication with a carbonator vessel, a housing enclosing said sensing means, said housing being mountable within a carbonator vessel and having, a water chamber within the housing,
a water inlet port through the housing and into the water chamber, said inlet port being substantially above a bottom of the water chamber,
a water outlet port through the housing and from the water chamber, said outlet port being substantially below said inlet port, and
a valve seat in said outlet port and facing fluidly away from said water chamber;

the improvement comprising:
(1) a valve cage secured to the housing and underneath the valve seat, and
(2) a buoyant elastomeric ball enclosed and freely buoyantly movable within said valve cage, said ball being a valve element seatable against the valve seat by flow of water upwardly into said outlet port and toward the water chamber.

34. A carbonator water level control according to claim 33, in which said freely buoyant elastomeric ball valve element has a specific gravity greater than 0.90 and less than 1.00.

35. A carbonator water level control according to claim 34, in which the specific gravity of the ball is in the range of 0.94 to 0.98.

36. In a liquid level control having
means for sensing the level of a liquid,
a housing enclosing said sensor means and having a liquid chamber within which said sensing means is operable,
a liquid inlet port substantially above a bottom of the liquid chamber and through said housing and into said liquid chamber,
a liquid outlet port substantially below said inlet port and through said housing and from said liquid chamber, and
means in said outlet port for closing the outlet in response to upward flow of liquid thereinto and towards the liquid chamber, and for opening said outlet port in response to downward flow of liquid from the chamber into the outlet port, the improvement comprising:
(1) mounting means for mounting the control within a liquid container, said sensing means being mountable to said mounting means;
(2) a disc shaped housing retainer fastened to said mounting means;

(3) an integral fluid tight seal section in said retainer and in fluid tight sealing engagement with said mounting means and said sensing means; and (4) means on said housing and in engagement with the retainer disc for removably securing the housing to the disc.

37. A liquid level control, comprising:

(a) means for sensing the level of a liquid;

(b) a housing enclosing said sensor means and having a liquid chamber within which said sensing means is operable;

(c) a liquid inlet port substantially above a bottom of the liquid chamber and through said housing and into said liquid chamber;

(d) a liquid outlet port substantially below said inlet port and through said housing and from said liquid chamber;

(e) means in said outlet port for closing the outlet in response to upward flow of liquid thereinto and towards the liquid chamber, and for opening said outlet port in response to downward flow of liquid from the chamber into the outlet port;

(f) means for mounting said control in a liquid container, said sensing means being mounted to said mounting means;

(g) a housing retainer secured to said mounting means;

(h) a plurality of radially spaced apart and axially slotted liquid inlet ports in the housing; and (i) a cantilevered finger between each adjacent pair of inlet ports, each of said fingers having means for snapping onto said retainer and mounting the housing to the retainer.

38. A liquid level control comprising:

(a) means for sensing the level of a liquid;

(b) a housing enclosing said sensor means and having a liquid chamber within which said sensing means is operable;

(c) a liquid inlet port substantially above a bottom of the liquid chamber and through said housing and into said liquid chamber;

(d) a liquid outlet port substantially below said inlet port through said housing and from said liquid chamber; and (e) means in said outlet port for closing the outlet in response to upward flow of liquid thereinto and towards the liquid chamber, and for opening said outlet port in response to downward flow of liquid from the chamber into the outlet port, and in which said sensing means comprise a reed switch and a buoyant float having means for operating said reed switch, said float being within said sensor housing and being movable up and down within the liquid chamber of the housing, and in which the buoyant float is sized with respect to the water chamber of the sensor housing such that the float displaces a majority of the volume within the water chamber.

39. A liquid level control, comprising:

(a) means for sensing the level of a liquid;

(b) a housing enclosing said sensor means and having a liquid chamber within which said sensing means is operable;

(c) a liquid inlet port substantially above a bottom of the liquid chamber and through said housing and into said liquid chamber;

(d) a liquid outlet port substantially below said inlet port and through said housing and from said liquid chamber; and (e) means in said outlet port for closing the outlet in response to upward flow of liquid thereinto and towards the liquid chamber, and for opening said outlet port in response to downward flow of liquid from the chamber into the outlet port, said closing means comprising (1) a downward facing valve seat on the bottom of the outlet port, and (2) a freely buoyantly movable elastomeric valve member below the valve seat and fluid tightly seatable against the valve seat, said elastomeric member being buoyant in a liquid for which the level control is intended.

* * * * *